(12) United States Patent
Torrison

(10) Patent No.: US 8,641,058 B2
(45) Date of Patent: Feb. 4, 2014

(54) HAND TRUCK BRAKE

(75) Inventor: Mark E. Torrison, Yuba City, CA (US)

(73) Assignee: Escalera, Inc., Yuba City, CA (US)

( * ) Notice: Subject to any disclaimer, the term of this patent is extended or adjusted under 35 U.S.C. 154(b) by 0 days.

(21) Appl. No.: 13/462,588

(22) Filed: May 2, 2012

(65) Prior Publication Data

US 2012/0280462 A1    Nov. 8, 2012

Related U.S. Application Data

(60) Provisional application No. 61/482,499, filed on May 4, 2011.

(51) Int. Cl.
*B62B 1/00*    (2006.01)

(52) U.S. Cl.
USPC .................. 280/47.27; 280/47.131; 280/47.2

(58) Field of Classification Search
USPC ................................ 280/47.27, 47.131, 47.2
See application file for complete search history.

(56) References Cited

U.S. PATENT DOCUMENTS

| | | |
|---|---|---|
| 3,486,587 A | 12/1969 | Malloy |
| 3,494,440 A | 2/1970 | Hanson |
| 3,907,138 A | 9/1975 | Rhodes |
| 4,046,391 A | 9/1977 | Restad et al. |
| 4,109,740 A | 8/1978 | Andruchiw |
| 5,195,762 A | 3/1993 | Pressly |
| 5,433,464 A | 7/1995 | Hlebakos |
| D363,052 S | 10/1995 | Laird |
| 5,524,731 A | 6/1996 | Grieg |
| 5,799,959 A * | 9/1998 | Krawczyk .................. 280/47.27 |
| 6,123,162 A * | 9/2000 | Rodriguez et al. ............. 180/8.3 |
| 6,164,398 A | 12/2000 | Alber |
| 6,336,642 B1 | 1/2002 | Carstens |
| 6,341,784 B1 | 1/2002 | Carstens |
| 6,398,477 B1 | 6/2002 | Fox |
| 6,752,400 B2 | 6/2004 | Nakatsukasa et al. |

(Continued)

FOREIGN PATENT DOCUMENTS

| | | |
|---|---|---|
| DE | 3934234 | 4/1991 |
| DE | 10113635 | 12/2002 |

OTHER PUBLICATIONS

Website, http://www.csnsupply.com/asp/superbrowse.asp?clid=221&caid=&sku=WM1103&PiID=932115&refid=FR4-WM1103_932115, Hand truck with brake option and series of additional hand trucks, dollies, carts, etc., printed from the internet on Oct. 25, 2009.

*Primary Examiner* — Tashiana Adams
*Assistant Examiner* — Marlon Arce
(74) *Attorney, Agent, or Firm* — Richard C. Litman

(57) ABSTRACT

The hand truck brake provides automatic braking for a hand truck as it negotiates a stairway or other uneven surface. The brake is adaptable to various types of hand trucks, including powered stair-climbing trucks. The brake includes two major assemblies. The first is a reciprocating plunger having a distal roller that travels along the surface. When the roller travels over the nose of a stairway tread, the plunger extends to actuate the brake. The second major assembly is a rotary cam rotated by the plunger as it extends. The cam has an extension and a brake shoe, the brake shoe engaging the underlying surface to stop the hand truck when the cam is rotated to its brake-engaging position. The assembly automatically retracts when the hand truck is oriented vertically. Additional controls are provided for the operator to extend or retract the brake mechanism.

15 Claims, 10 Drawing Sheets

(56) References Cited

U.S. PATENT DOCUMENTS

| | | |
|---|---|---|
| 6,935,447 B2 | 8/2005 | Bierma |
| 7,137,464 B2 | 11/2006 | Stahler, Sr. |
| 7,410,180 B1 * | 8/2008 | Nguyen et al. ............... 280/79.7 |
| 7,731,205 B2 * | 6/2010 | Wise ........................ 280/47.131 |
| 2009/0133517 A1 * | 5/2009 | Kamara et al. ............... 74/10.29 |
| 2010/0021275 A1 * | 1/2010 | Ratermann .................... 414/454 |
| 2012/0025482 A1 * | 2/2012 | Wyse et al. ................ 280/47.24 |

* cited by examiner

HAND TRUCK BRAKE

CROSS-REFERENCE TO RELATED APPLICATION

This application claims the benefit of U.S. Provisional Patent Application Ser. No. 61/482,499, filed May 4, 2011.

BACKGROUND OF THE INVENTION

1. Field of the Invention

The present invention relates to carts, dollies, hand trucks, and the like, and particularly to a hand truck brake serving to prevent a hand truck from rolling on the tread of a step while negotiating steps or stairways.

2. Description of the related art

Hand trucks, carts, dollies, and similar articles of equipment are commonly used to transport large and bulky objects (e.g., furniture, office equipment, etc.) over relatively short distances, as to or from a delivery truck or within a building structure. Most such hand trucks and the like are manually operated, i.e., they have no additional motive power (e.g., electric motor, etc.). However, a subclass of such hand trucks is configured or adapted for climbing and descending stairways, most of these devices including some form of motive power.

One common need of all such devices, whether powered or non-powered and whether specially adapted for use on stairs or not, is the need to provide some form of braking action to prevent the device from rolling from a step when negotiating steps or stairways. This is conventionally achieved by the operator of the hand truck, who manually holds the truck to prevent it from moving. In practice, this can be difficult at times, depending upon the diameter and relative location of the wheels of the truck, the fore and aft width of the tread of the stairs, whether there is any slope to the stairway tread(s), and other factors. At times, it may require considerable strength to prevent a loaded hand truck from dropping down the stairs if the centers of the wheels are even slightly beyond the nose of the stairway tread. Even when the hand truck is momentarily stable on a stairway tread, it takes only a moment of inattention and slight movement to cause the hand truck to roll beyond the nose of a stairway tread and proceed down the stairway or steps. Even though powered devices configured for negotiating stairways have considerable mechanical advantage limiting the rotation of the wheels when the motor is stopped, they still may roll to some degree against such mechanical advantage, and they may roll freely if the motor and/or driveline are disengaged from the wheels.

As a result, a number of braking devices have been developed in the past for the wheels and/or casters of hand trucks, dollies and carts and the like. One example of such is found in German Patent No. 3,934,234, published on Apr. 18, 1991, which describes (according to the drawings and English abstract) a "wheelbarrow" or hand truck having two sets of wheels to assist in drawing the truck up and over the nose of each stairway tread. The wheels have ratcheting brakes that allow rotation in only one direction to prevent them from rolling down a set of steps. The ratchet brakes are controlled by the operator, who actuates a lever at the top of the hand truck frame.

Another example of a hand truck or cart configured for negotiating stairways is found in German Patent No. 10,113,635 published on Dec. 5, 2002. This document describes (according to the drawings and English abstract) a "trolley" or hand truck having main wheels in a "star wheel" configuration, i.e., a series of small wheels located at the distal ends of a series of radial arms, the arms and wheels rotating about a common single axis. Manually controlled brakes are provided to prevent rotation of the "star wheel" assembly and of the forwardly disposed casters.

Thus, a hand truck brake solving the aforementioned problems is desired.

SUMMARY OF THE INVENTION

The hand truck brake provides automatic braking action for a hand truck as it negotiates a stairway or uneven sloping terrain. The device may be provided either as a kit or assembly for installation to an existing hand truck, or in combination with a hand truck at the time of manufacture. The device is particularly well suited for installation to an electrically or otherwise powered hand truck adapted for climbing and descending stairs and steps, but may also be applied to any other practicable hand truck configuration. Most preferably, one brake assembly is provided for each wheel in a conventional two-wheel hand truck having a single axle.

The hand truck brake comprises two major components. The first is a reciprocating plunger having a roller on its distal end. The plunger acts as a feeler and bears against the underlying surface. When the roller rolls over the nose of a stairway tread, the plunger drops to actuate the brake. The other major component is a rotary cam that is actuated by the movement of the plunger. When the plunger drops, it causes the cam to rotate in order to apply the brake. The brake is a shoe attached to an extension of the cam, the shoe rotating to bear against the underlying surface when the cam rotates due to actuation by the plunger.

The above-described operation is entirely automatic, and needs no action or intervention on the part of the operator of the hand truck. Orienting the hand truck to the vertical, i.e., with the toe plate resting upon the surface, pushes the plunger upward to lock it automatically in its retracted position. A control is provided for the operator to deploy the plunger and roller assembly for further braking operation if the system has been disengaged or retracted, and another control is provided for the operator to retract or disengage the brake without orienting the truck to the vertical if the brake has been actuated. The controls are located with the brake assembly and are configured for ease of operation by the foot of the operator to obviate any need for the operator to bend down to access the controls.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The hand truck brake provides automatic braking for a hand truck or the like as it negotiates a flight of steps or other uneven terrain or surface. The brake is particularly well adapted for installation in a motorized, stair-climbing hand truck, but may be adapted to any other practicable hand truck or the like.

Figure 1:
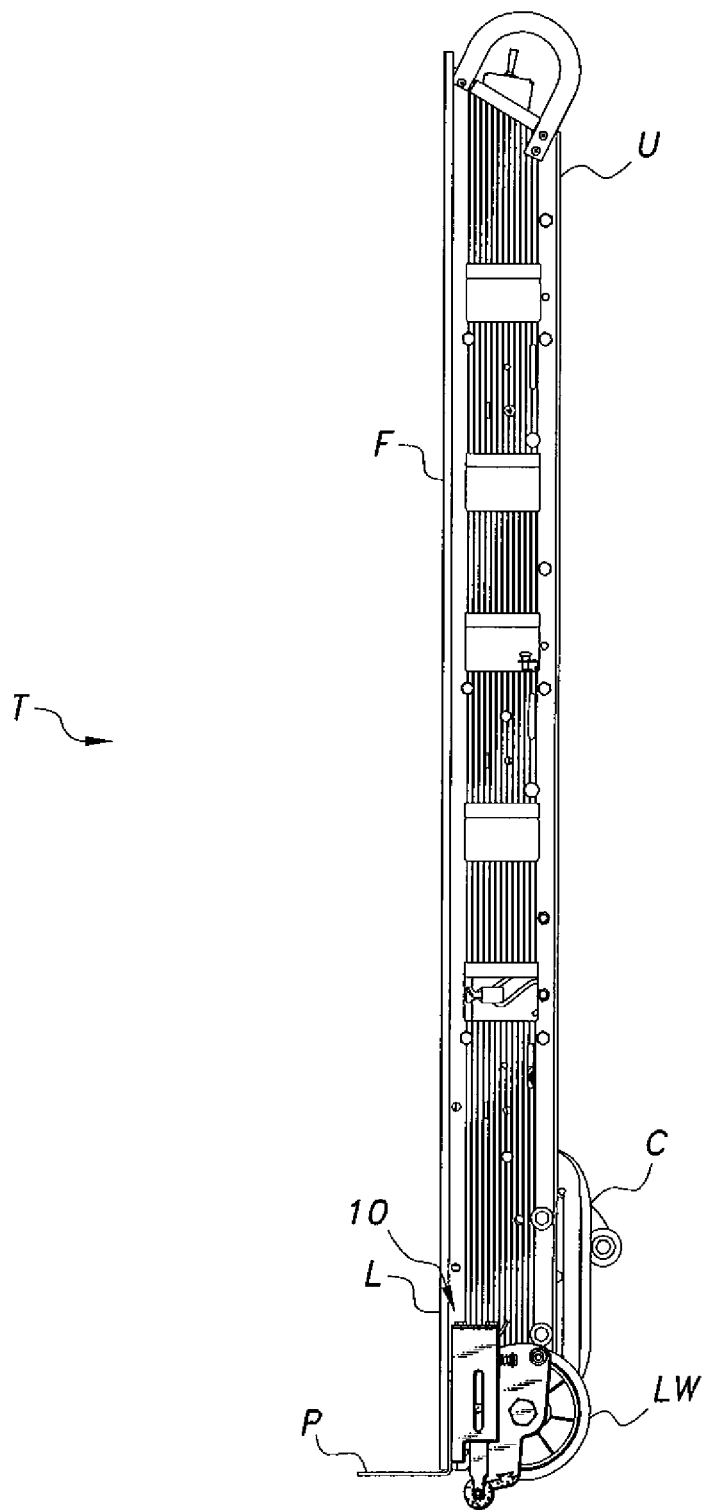
FIG. 1 is a left side elevation view of a stair-climbing hand truck incorporating a hand truck brake according to the present invention.

FIG. 1 of the drawings is an illustration of an exemplary stair-climbing hand truck T. The hand truck brake 10 is shown installed immediately outboard of the left wheel LW of the hand truck T. The hand truck T includes a number of conventional features, i.e., a frame F having an upper end U and opposite lower end L, and conventional left and right wheels LW and RW installed at the lower end L of the frame F. (The right wheel RW is partially illustrated in the elevation view in section of FIG. 8.) The illustrated hand truck T represents a model manufactured by the Escalera Company of Yuba City, Calif., and includes a stair climbing and descending mechanism C disposed rearward of the frame F. However, the hand truck brake 10 may be adapted to other types of hand trucks, as noted above. Only a single brake mechanism 10 is shown in the various views of the drawings due to the orientation of the hand truck T and its components in those views. However, it will be understood that two such brake mechanisms 10 are preferably installed on any given hand truck, one brake mechanism 10 being installed adjacent each of the two wheels LW and RW conventionally provided on such hand trucks.

Figure 2:
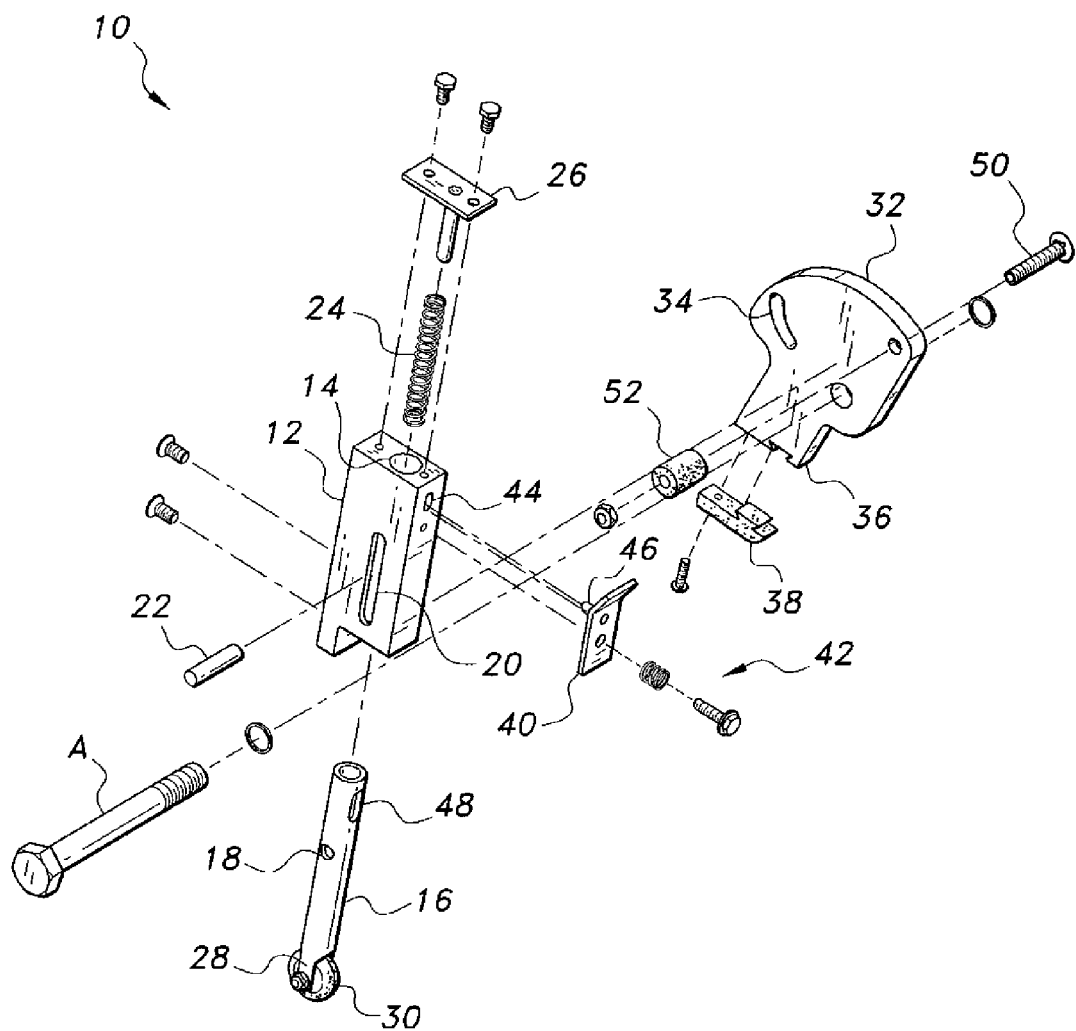
FIG. 2 is an exploded perspective view of a hand truck brake according to the present invention.
Figure 3:
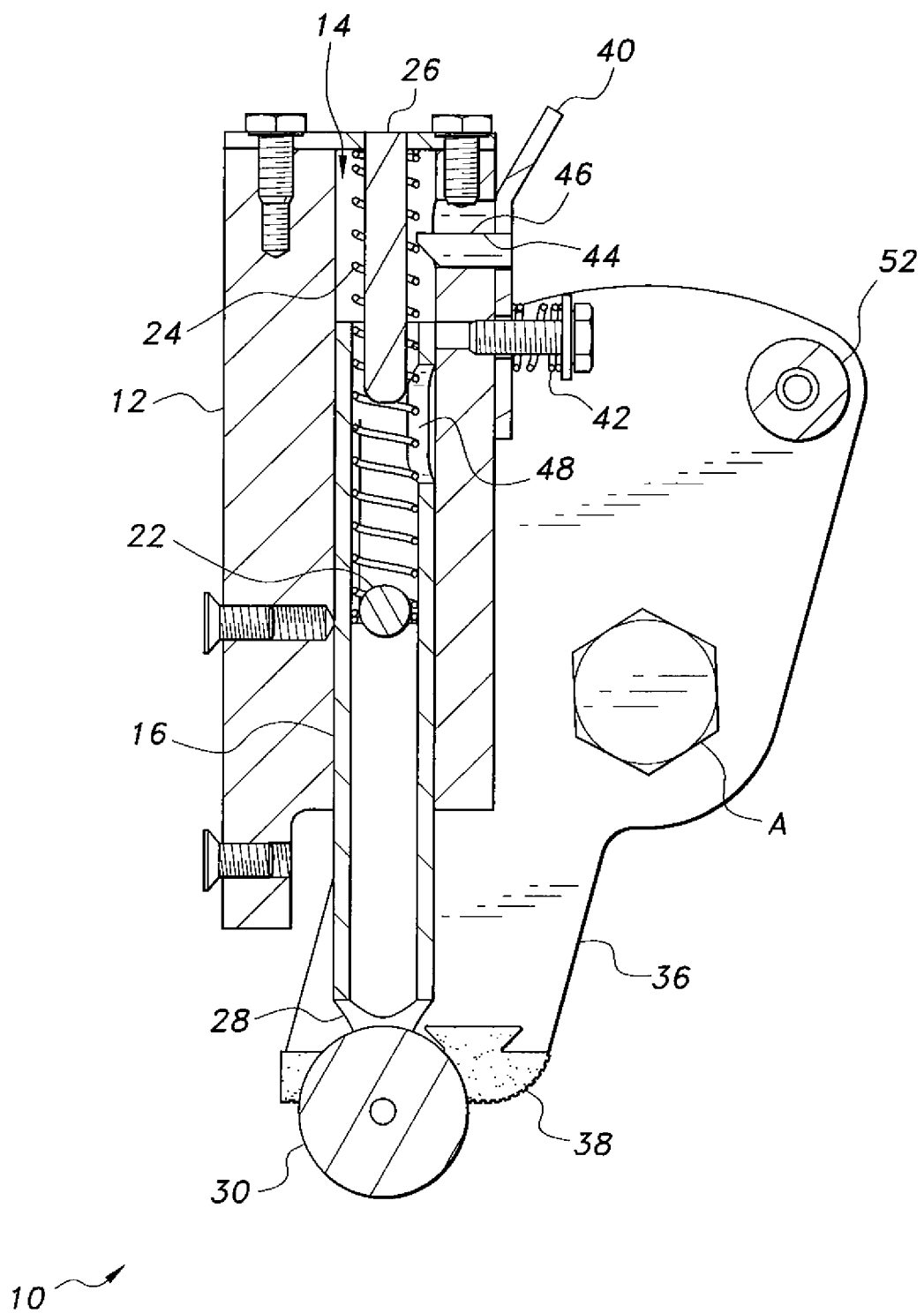
FIG. 3 is a detailed left side elevation view in section of a hand truck brake according to the present invention, illustrating various operational details thereof.
Figure 4:
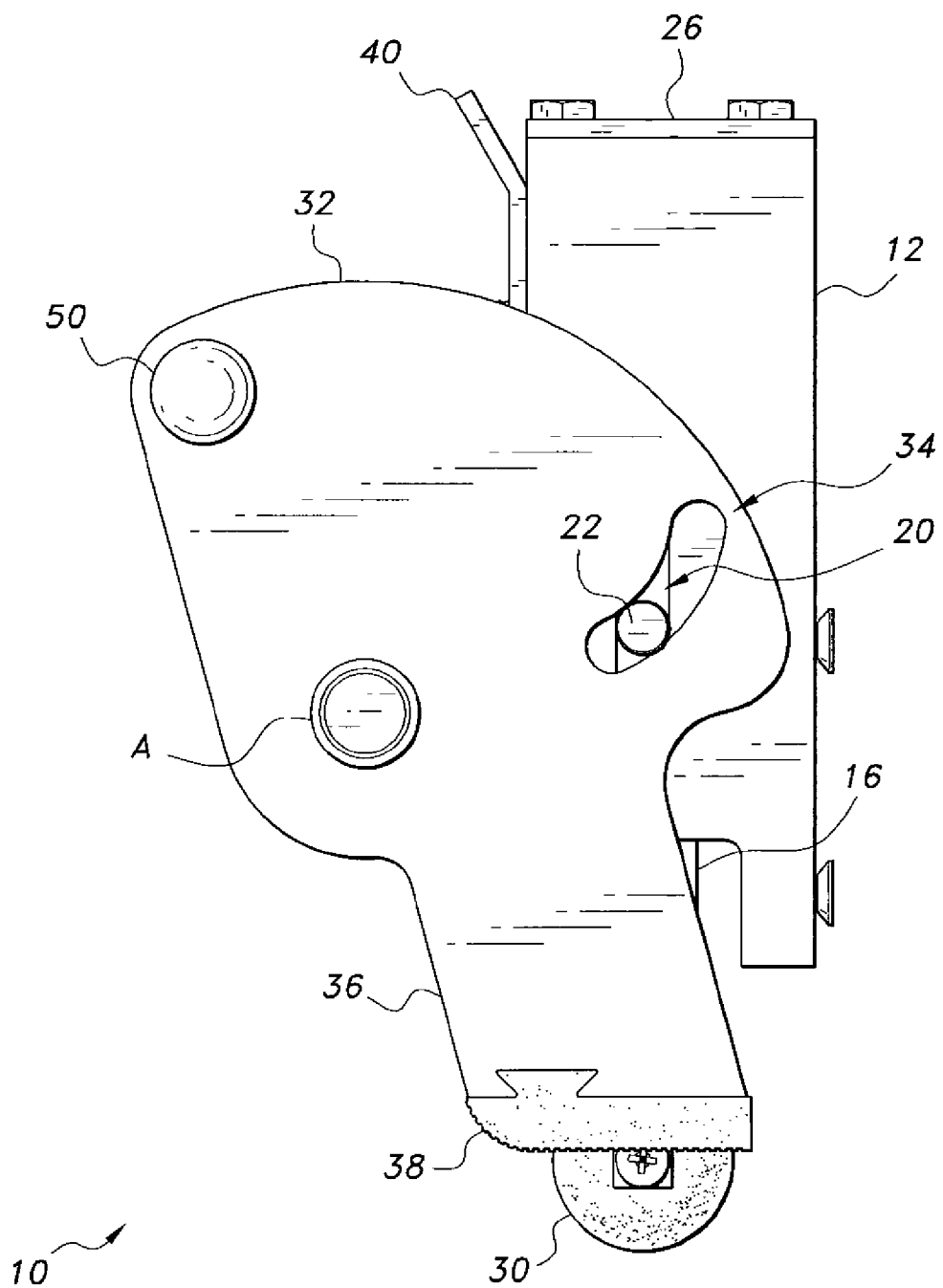
FIG. 4 is a detailed right side elevation view of the hand truck brake according to the present invention, illustrating further details.

FIG. 2 provides an exploded perspective view of the brake mechanism 10, illustrating its various parts. FIGS. 3 and 4 respectively provide an elevation view in section through the housing of the mechanism, and an opposite side elevation view of the assembly. The brake mechanism 10 includes a housing 12 having a feeler passage 14 disposed therethrough. An elongate feeler 16 is installed within the feeler passage 14 of the housing 12. The feeler 16 includes a transverse pin passage 18 therethrough. The housing 12 has an elongate slot 20 therethrough that is aligned with the feeler passage 14. A feeler retaining and cam engagement pin 22 is installed through the housing slot 20 and the pin passage 18 of the feeler 16 in order to retain the feeler 16 within the passage 14 in the housing 12. The feeler 16 travels upward and downward in the feeler passage 14 of the housing 12 within the limits defined by the ends of the housing slot 20, and is urged outward (downward) from the housing 12 by a spring 24 that passes concentrically through the upper portion of the tubular feeler 16 to bear against the feeler retaining and cam engagement pin 22. The spring 24 is installed through the top of the housing 12 and is retained therein by a retainer plate 26 and spring guide removably installed atop the housing 12. The feeler 16 is in contact with the surface over which the hand truck T is traveling when the brake mechanism 10 is deployed, and accordingly has a lower distal end 28 having a roller 30 extending therefrom to rotate freely upon the contact surface therebeneath.

A cam 32 is pivotally mounted on each axle bolt or shaft A of the hand truck T. The housing 12 is immovably affixed to the structure of the lower portion L of the hand truck frame F, e.g., to the back of the load-carrying platform P. The cam 32 communicates mechanically with the housing 12 and feeler 16 by means of an arcuate slot 34 disposed through or into the cam 32. The feeler retaining and cam engagement pin 22 extends from the feeler 16, through the slot 20 of the housing 12, and into the cam slot 34. The cam further includes a brake extension 36 extending from its lower portion. A brake shoe 38 is attached to the brake extension 36.

Figure 5:
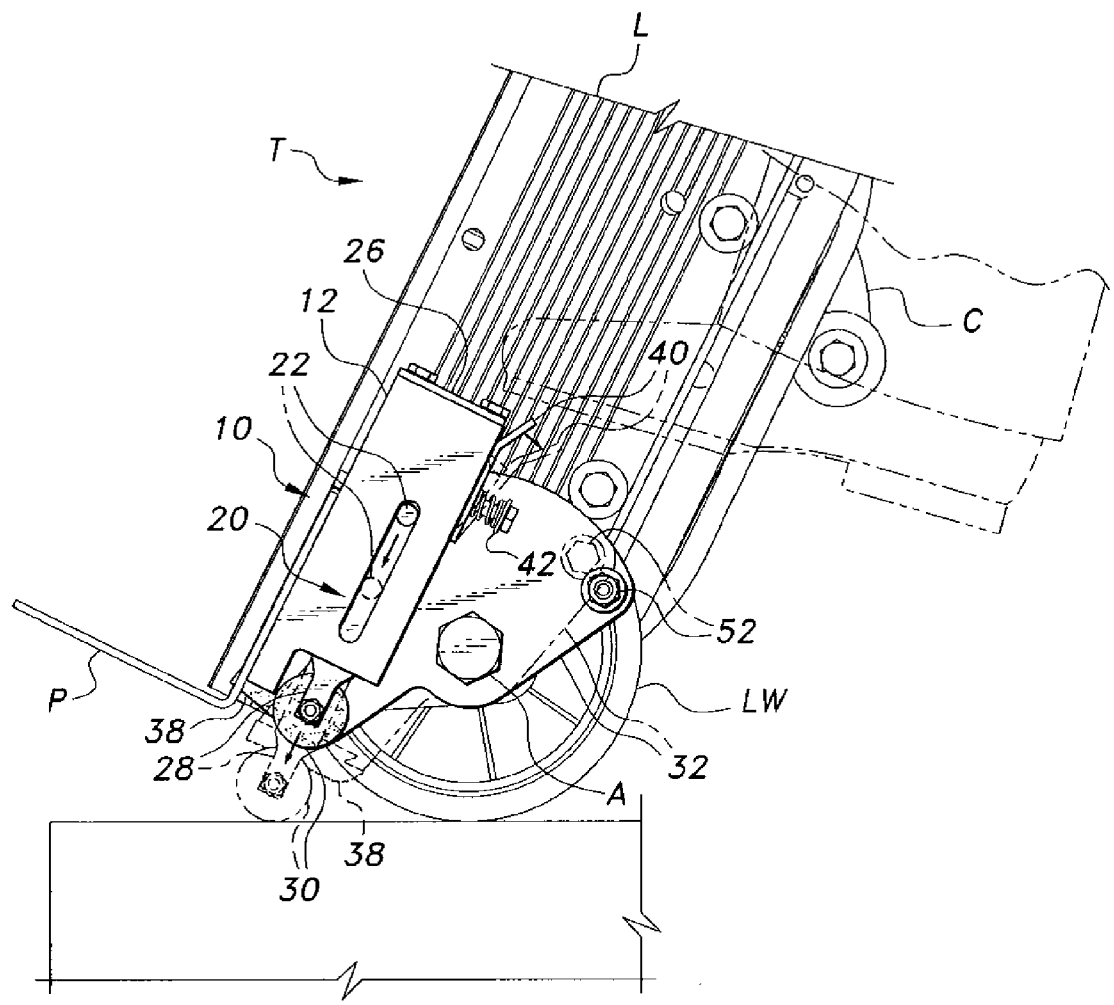
FIG. 5 is a partial left side elevation view of the lower end of a hand truck incorporating the hand truck brake according to the present invention, illustrating the deployment of the brake for use.

FIG. 5 illustrates the deployment of the brake mechanism 10 by the operator of the hand truck T. The brake mechanism 10 is retractable when not in use, as noted further above. The brake mechanism 10 may be retracted, i.e., the feeler 16 may be drawn upward into the passage 14 within the housing 12, when braking is not desired. When the operator of the hand truck T wishes to use the brake 10, he or she may use a foot-operated device to deploy the brake, i.e., to allow the feeler 16 to extend from its passage in the housing 12. The housing 12 includes a feeler retraction latch 40 extending from the upper rear portion thereof. The latch 40 is disposed directly upon the housing 12 with no additional intervening or remotely actuated mechanisms, and is biased against the back of the housing 12 by a retaining bolt and spring assembly 42. The housing 12 has a latch pin passage 44 (FIGS. 2 and 3) through the upper rear portion thereof. A latch pin 46 extends from the latch 40 through the latch pin passage 44 in the housing 12. The feeler 16 includes a latch engagement slot 48 in the rearward side thereof, as shown in FIGS. 2 and 3.

Normally, the retaining bolt and spring assembly 42 hold the latch 40 securely against the back of the housing 12, the latch pin 46 being completely seated through the latch pin passage 44 of the housing 12 and extending partially into the feeler passage 14 in the housing 12. It will be noted that the lower, inboard end of the latch pin 46 is tapered. Thus, if the feeler 16 is pushed upwardly into the passage 14 in the housing 12, the upper end of the feeler 16 will push the tapered end of the latch pin 46 outward to allow the feeler 16 to retract. As the feeler 16 retracts into its passage 14, the latch engagement slot 48 in the feeler 16 passes over the tapered inboard end of the latch pin 46, allowing the retaining bolt and spring 42 to push the latch 40 and the inboard tip of the pin 46 into the latch engagement slot 48 of the feeler 16. The upper edge of the latch engagement slot 48 in the feeler 16 will catch on the straight upper side of the latch pin 46, thus holding the feeler 16 in retraction within the housing 12. However, if the operator of the hand truck T wishes to extend the feeler 16, he or she need only step on the upper end of the latch 40, as shown in FIG. 5, to draw the latch 40 rearward against the retaining pressure of the spring and bolt assembly 42, thus withdrawing the latch pin 46 from the latch engagement slot 48 in the feeler 16. The feeler extension spring 44 then pushes the feeler 16 downward to extend the feeler 16 from the housing 12.

Figure 6:
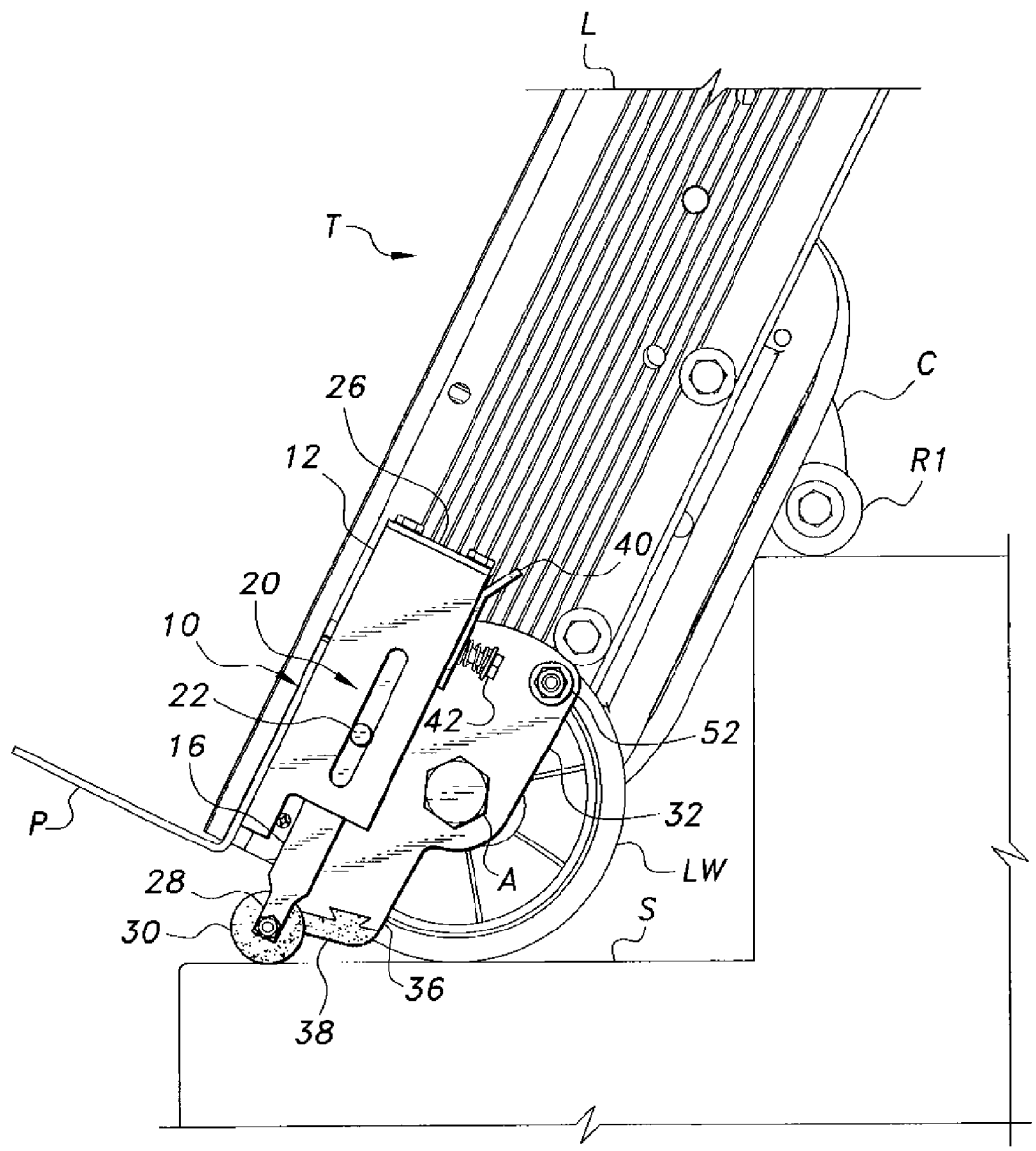
FIG. 6 is a partial left side elevation view of the lower end of a hand truck incorporating the hand truck brake according to the present invention, illustrating the released brake on a level surface.
Figure 7:
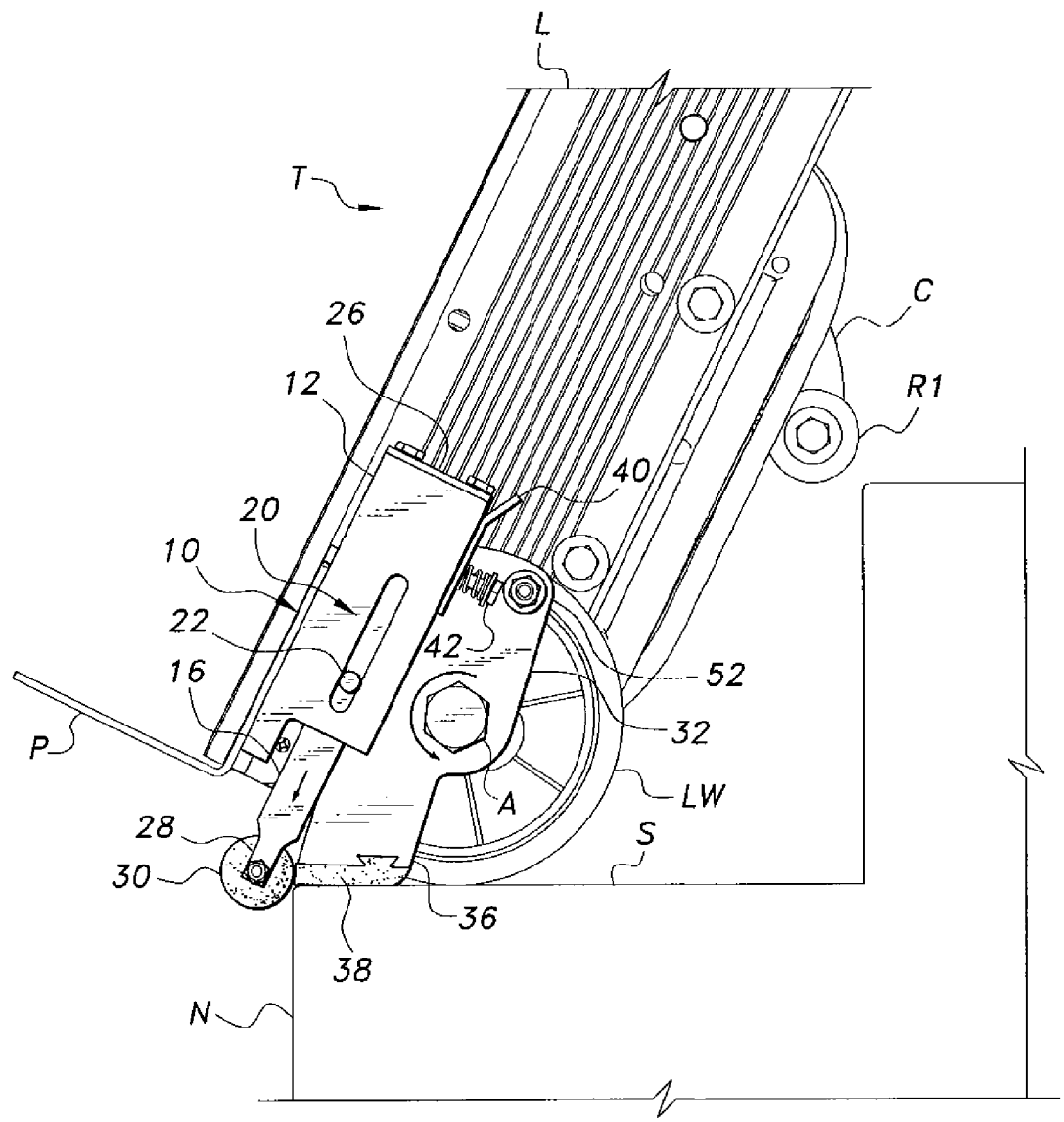
FIG. 7 is a partial left side elevation view of the lower end of a hand truck incorporating the hand truck brake according to the present invention, illustrating actuation of the brake as the feeler passes over the nose of a stair tread.
Figure 8:
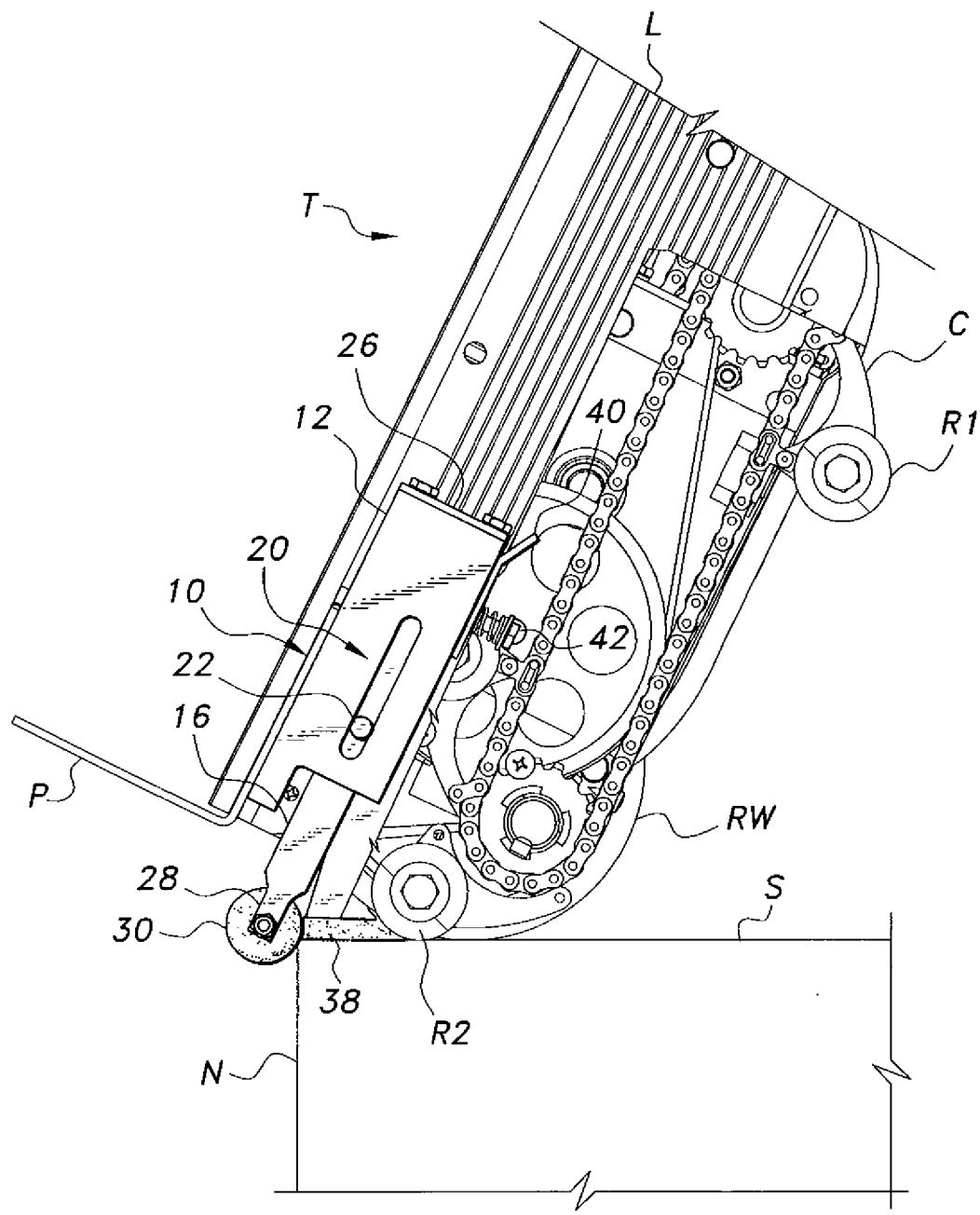
FIG. 8 is a partial left side elevation view in section of the lower end of a stair-climbing hand truck incorporating the hand truck brake according to the present invention, illustrating lifting the hand truck and release of the brake by the stair-climbing mechanism.

FIGS. 6, 7, and 8 illustrate the operation of the automatic brake mechanism 10 as the hand truck T negotiates a set of steps or stairs. In the example of FIGS. 6 through 8, the hand truck T is descending a flight of steps or stairs with the hand truck brake 10 deployed. The upwardly positioned roller R1 of the stair climbing and descending mechanism C is at or near the top of its travel in FIG. 6, after having lowered the two wheels LW and RW of the hand truck T to an intermediate step S of the flight of steps or stairs. The two wheels LW, RW of the hand truck T are free to roll across the surface of the step S in FIG. 6, as the brake mechanism 10 has not engaged the surface at this point. This is because the roller 30 of the feeler 16 is also rolling across the surface of the step 5, the feeler 16 being partially retracted within the housing 12. The feeler 16 communicates mechanically with the cam 32 by means of the feeler retention and cam engagement pin 22 engaging the arcuate slot 34 of the cam 32, as shown in FIG. 4. This results in the cam 32 rotating clockwise slightly (as viewed in FIG. 6, i.e., the opposite side from FIG. 4), thereby lifting the brake shoe 38 forward and upward, away from the surface of the step S, thereby allowing all of the wheels to roll freely.

As the hand truck rolls forward across the surface of the step S, the forwardly disposed roller 30 of the feeler 16 will reach and drop over the edge or nose N of the step S, as shown in FIG. 7. When this happens, the feeler 16 extends downward from its housing 12, the feeler retention and cam engaging pin 22 moving downward as well. The engagement of the pin 22 in the arcuate slot 34 of the cam 22 results in the cam rotating counterclockwise (as seen in FIG. 7), thus dropping the brake shoe 38 onto the surface of the step S to stop any rolling movement of the hand truck T.

FIG. 8 illustrates the continuing operation of the stair climbing hand truck T and its brake mechanism 10. In FIG. 8 the stair climbing and descending mechanism C has drawn the second roller R2 counterclockwise around the mechanism by means of its chain drive system. The roller R2 is shown near (but not quite at) its lowermost position in FIG. 8. As the stair climbing and descending mechanism C continues to operate, the second roller R2 will travel further counterclockwise around its chain driven path, lifting the brake shoe 38 slightly from the surface of the step S. This allows the hand truck T to move forward beyond the nose N of the step S, at which point the hand truck T is supported by the second roller R2 to descend from the step S to the next lower step. The process repeats with each succeeding step, the feeler 16 being pushed into its housing 12 to rotate the cam 32 and its brake shoe 38 clear of the underlying step surface until the roller 30 of the feeler 16 drops over the nose of the succeeding step to rotate the cam 32 and drop the brake shoe 38 onto the step surface. Actuation of the stair climbing and descending mechanism allows the hand truck T to travel over the nose of that step, and down to the next lower step. The direction of travel of the chain drive of the stair climbing and descending mechanism C is reversed to ascend a set of steps, hand truck brake 10 working as described above.

When the steps have been negotiated and the hand truck T is on a level surface, the hand truck brake 10 (or more accurately, the feeler 16) may be retracted into the housing 12 to prevent deployment or extension of the feeler 16 and corresponding actuation of the brake show 38. Two methods are provided for retracting the feeler 16, as shown in FIGS. 9 and 10.

Figure 9:
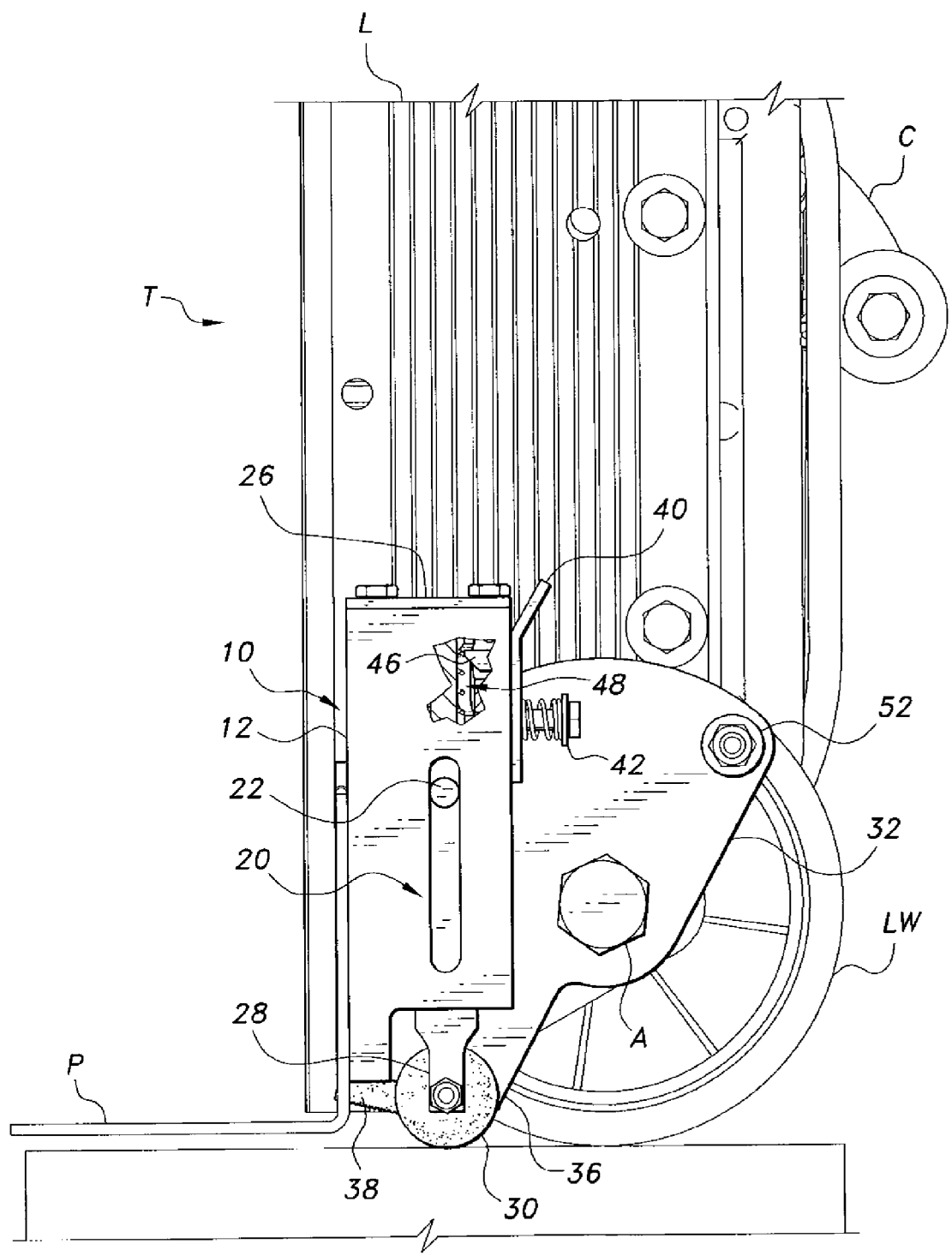
FIG. 9 is a partial left side elevation view in section of the lower end of a hand truck incorporating the hand truck brake according to the present invention, illustrating automatic retraction of the brake mechanism as the truck is oriented vertically.
Figure 10:
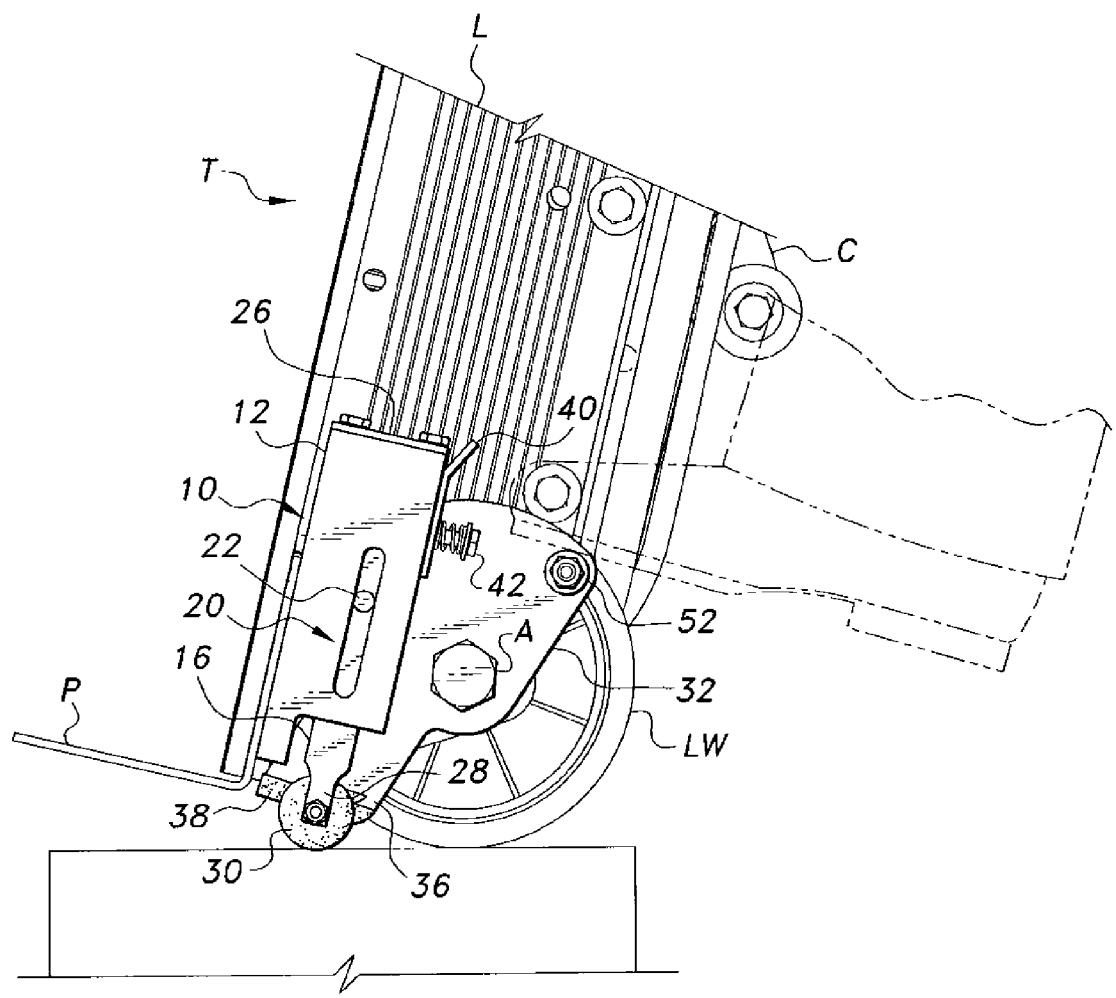
FIG. 10 is a partial left side elevation view in section of the lower end of a hand truck incorporating the hand truck brake according to the present invention, illustrating retraction of the brake mechanism by the operator.

The first method of FIG. 9 occurs essentially automatically when the hand truck T is positioned with its frame F oriented vertically. When this is done, the feeler 16 is pushed upwardly into the housing 12 until the latch engagement slot 48 of the feeler 16 catches on the latch pin 46, the latch pin 46 then holding the feeler 16 retracted in its housing 12 regardless of the orientation of the hand truck T. This allows the hand truck T to be moved over a surface without the brake shoe 38 extending and dragging on the underlying surface. When the operator of the hand truck T wishes to actuate the brake mechanism 10, he or she need only use his or her foot top pull the top of the feeler retraction latch 40 back to release the pin 46 and allow the feeler 16 to extend from its housing 12, generally as shown in FIG. 5 and described in detail further above.

Alternatively, the operator of the hand truck T may retract the feeler 16 by rotating the cam 32. This procedure is illustrated in FIG. 10 of the drawings. A brake retraction control is provided on the cam 32 for the operator to actuate when the operator finds that he or she cannot orient the hand truck T vertically on a surface to retract the feeler 16, as described above and shown in FIG. 9. The brake retraction control comprises a control lever bolt 50 (shown clearly in the exploded view of FIG. 2) installed through the upper portion of the cam 32, and a foot-operated peg 52 installed on the lever bolt 50. The control lever bolt 50 and its peg 52 are disposed directly upon the cam 32 with no additional intervening or remotely actuated mechanisms. The operator need only step on the peg 52 to push it downward and rearward, thereby rotating the cam 32 clockwise, as shown in FIG. 10. This draws the feeler 16 upward in the housing 12, since the arcuate slot 34 of the cam 32 draws the feeler retention and cam engagement pin 22 upward as the cam 32 rotates. When the feeler 16 is drawn upward in the housing to a sufficient point, the latch pin 46 engages the latch engagement slot 48 of the feeler 16 to hold the feeler 16 in its retracted state. Deployment of the hand truck brake 10, or more accurately the feeler 16 of the hand truck brake 10, for operation is accomplished as described further above in the description of the operation shown in FIG. 5.

It is to be understood that the present invention is not limited to the embodiments described above, but encompasses any and all embodiments within the scope of the following claims.

I claim:

1. A hand truck brake, comprising:
a housing;
a feeler disposed within the housing, the feeler selectively extending therefrom, the feeler having a lowermost distal end;
a cam communicating mechanically with the feeler, the cam having a brake shoe extension;
a brake shoe disposed upon the brake shoe extension, the brake shoe selectively deploying when the cam is operated by extension of the feeler from the housing;
an operator-actuated brake deployment control communicating mechanically with the feeler; and
an operator-actuated brake retraction control communicating mechanically with the brake shoe;
wherein the brake deployment control is disposed directly upon the housing; and
wherein the brake retraction control is disposed directly upon the cam.

2. A powered, stair-climbing hand truck, comprising:
a frame having an upper end and a lower end;
laterally opposed first and second wheels disposed at the lower end of the frame;
a stair climbing and descending mechanism extending rearward of the frame; and a first hand truck brake according to claim 1 mounted on the frame adjacent the first wheel and a second hand truck mechanism according to claim 1 mounted on the frame adjacent the second wheel.

3. The powered, stair-climbing hand truck according to claim 2, further comprising an automatically actuated brake retraction mechanism communicating with the feeler of each said hand truck brake, the brake retraction mechanism automatically locking the feelers in a retracted state when the frame of the hand truck is oriented vertically.

4. The hand truck brake according to claim 1, further comprising a cam engagement pin extending laterally from the feeler, the cam being pivotally disposed relative to the housing, the cam having a slot disposed therein, the cam engagement pin engaging the slot in the cam.

5. The hand truck brake according to claim 1, further comprising a freely rotating roller extending from the distal end of the feeler.

6. A hand truck brake, comprising:
a housing;
a feeler disposed within the housing and selectively extending therefrom, the feeler having a lowermost distal end;
a brake shoe communicating mechanically with the feeler, the brake shoe being selectively deployed by extension of the feeler from the housing;
a cam pivotally disposed relative to the housing, the brake deployment control being disposed directly upon the housing, the brake retraction control being disposed directly upon the cam;
an operator-actuated brake deployment control communicating mechanically with the feeler; and
an operator-actuated brake retraction control communicating mechanically with the brake shoe.

7. The hand truck brake according to claim 6, further comprising a cam engagement pin extending laterally from the feeler, the cam having a slot disposed therein and a brake shoe extension, the cam engagement pin engaging the slot in the cam, the brake shoe being disposed upon the brake shoe extension.

8. A powered, stair-climbing hand truck, comprising:
a frame having an upper end and a lower end;
laterally opposed first and second wheels disposed at the lower end of the frame;
a stair climbing and descending mechanism extending rearward of the frame; and
a first hand truck brake according to claim 6 mounted on the frame adjacent the first wheel and a second hand truck mechanism according to claim 6 mounted on the frame adjacent the second wheel.

9. The hand truck brake according to claim 8, further comprising an automatically actuated brake retraction mechanism communicating with the feeler in each said hand truck brake, the brake retraction mechanism automatically locking the feelers in a retracted state when the frame of the hand truck is oriented vertically.

10. The hand truck brake according to claim 6, further comprising a freely rotating roller extending from the distal end of the feeler.

11. A powered, stair-climbing hand truck, comprising:
a frame having an upper end and a lower end;
laterally opposed first and second wheels disposed at the lower end of the frame;
a stair climbing and descending mechanism extending rearward of the frame;
first and second housings disposed upon the frame adjacent the first and second wheels;
a feeler disposed within each of the housings, the feeler selectively extending from the housings, each of the feelers having a lowermost distal end;
a brake shoe communicating mechanically with each of the feelers, each of the brake shoes selectively deploying by extension of the feelers from the housings;
an operator-actuated brake deployment control communicating mechanically with the feeler of each hand truck brake; and
an operator-actuated brake retraction control communicating mechanically with the brake shoe of each hand truck brake.

12. The powered, stair-climbing hand truck according to claim 11, further including a cam pivotally extending from the lower end of the frame of the frame adjacent each of the wheels thereof, the brake deployment control being disposed directly upon the housing, the brake retraction control being disposed directly upon the cam.

13. The powered, stair-climbing hand truck according to claim 11, further comprising an automatically actuated brake retraction mechanism communicating with the feeler in the first housing and the feeler in the second housing, the brake retraction mechanism automatically locking the feelers in a retracted state when the frame of the hand truck is oriented vertically.

14. The powered, stair-climbing hand truck according to claim 11, further comprising:
a cam pivotally extending from the lower end of the frame adjacent each of the wheels thereof, the cam having a slot disposed therein and a brake shoe extension; and
a cam engagement pin extending laterally from the feeler, the cam engagement pin engaging the slot in the cam.

15. The powered, stair-climbing hand truck according to claim 11, further comprising a freely rotating roller extending from the distal end of the feeler.

\* \* \* \* \*